(12) United States Patent
Han et al.

(10) Patent No.: US 11,708,177 B2
(45) Date of Patent: Jul. 25, 2023

(54) MULTI-LEVEL STRUCTURE CONVEYING SYSTEM AND METHOD FOR ASSISTING UNMANNED AERIAL VEHICLE LANDING

(71) Applicant: HUAZHONG UNIVERSITY OF SCIENCE AND TECHNOLOGY, Hubei (CN)

(72) Inventors: Bin Han, Hubei (CN); Xuedong Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 270 days.

(21) Appl. No.: 17/359,666

(22) Filed: Jun. 28, 2021

(65) Prior Publication Data
US 2022/0402629 A1    Dec. 22, 2022

(30) Foreign Application Priority Data
Jun. 16, 2021  (CN) .......................... 202110668422.6

(51) Int. Cl.
*B64F 1/22*    (2006.01)
*B64U 80/10*   (2023.01)
*B65G 15/24*   (2006.01)

(52) U.S. Cl.
CPC ............... *B64F 1/22* (2013.01); *B64U 80/10* (2023.01); *B65G 15/24* (2013.01)

(58) Field of Classification Search
None
See application file for complete search history.

(56) References Cited

U.S. PATENT DOCUMENTS

| 2022/0073214 A1* | 3/2022 | Liske | .............. B64F 1/22 |
| 2022/0080236 A1* | 3/2022 | Choi | .............. B64D 41/00 |
| 2022/0144451 A1* | 5/2022 | Tighe | .............. B64F 1/30 |

FOREIGN PATENT DOCUMENTS

DE    202021103462 U1 *  8/2021  .......... B64C 39/024

* cited by examiner

*Primary Examiner* — Kaitlin S Joerger
(74) *Attorney, Agent, or Firm* — JCIP Global Inc.

(57) ABSTRACT

A multi-level structure conveying system and method for assisting UAV landing are provided. The system includes conveying units and modular bottom plates. The modular bottom plate provides line connection between a power supply and a controller for the conveying unit. The conveying unit drives a UAV to move through driving a conveyor to move. Placement of the conveying units in different directions is used to control a movement direction of the UAV. The conveying units are connected through side plate modules to be arranged into conveying modules with different trajectories. The UAV moves on the conveying modules under driving of each conveying unit to reach a target position. A side plate bump of each conveying unit is sleeved opposite to a side plate recess of the adjacent conveying unit. A hollow channel formed by side plate holes of the adjacent conveying units is fixed by adopting a connecting shaft.

12 Claims, 13 Drawing Sheets

__MULTI-LEVEL STRUCTURE CONVEYING SYSTEM AND METHOD FOR ASSISTING UNMANNED AERIAL VEHICLE LANDING__

CROSS-REFERENCE TO RELATED APPLICATION

This application claims the priority benefit of China application serial no. 202110668422.6, filed on Jun. 16, 2021. The entirety of the above-mentioned patent application is hereby incorporated by reference herein and made a part of this specification.

BACKGROUND

Technical Field

The disclosure relates to the field of unmanned aerial vehicle (UAV) landing assist devices, and more specifically relates to a multi-level structure conveying system and method for assisting UAV landing.

Description of Related Art

Unmanned aerial vehicle is abbreviated as "UAV", which is an unmanned aerial vehicle operated by radio remote control equipment or its own program control device. UAVs have a wide range of applications, low cost, and good cost-effectiveness ratio; no risk of casualties; strong survivability, good maneuverability, and convenient usage, and play an important role in modern warfare and have broad prospects in the civilian field.

As UAVs are widely applied in various fields, there is still the issue of position uncertainty in fixed-point docking of UAV landing. After a UAV completes a mission or when there is an unexpected situation such as insufficient battery life or harsh environmental conditions (such as strong wind and heavy rain) during process of executing a mission, it is necessary to send the UAV back to a fixed target position for battery life charging or convey the landed UAV to a designated position for storage. Due to some uncontrollable factors in UAV landing, the UAV may not reach a precise position due to environmental interference or own conditions of the UAV. Compared with traditional conveying goods, conveying goods generally appear at the edge of a conveying device, and the UAV usually lands near a target position according to its own control. Therefore, after the UAV has landed, it is necessary to build the conveying device with the target position as the center.

By reviewing the prior art on the docking and recycling of UAVs, it is found that although there are also some devices for returning landed UAVs in the prior art, the structural design is generally cumbersome and the stability is poor, which may easily cause UAVs to fall and to be damaged. In summary, the issue of vertex position docking when the UAV is landing needs to be resolved.

SUMMARY

The disclosure provides a multi-level structure conveying system and method for assisting unmanned aerial vehicle (UAV) landing, which aims to solve the need to build a conveying device with a target position as the center after a UAV has landed, and poor mobility controllability of existing devices for returning and landing the UAV over the position of the UAV, which leads to the issues that the UAV has poor conveying capability and does not have large range conveying capability.

In order to implement the objective, on the one hand, the disclosure provides a multi-level structure conveying system for assisting UAV landing, which includes several conveying units and several modular bottom plates. The conveying units are fixedly placed on the modular bottom plates.

The modular bottom plate is used to transmit a control signal and a power supply of an internal controller to the conveying unit. The conveying unit is used to drive a conveyor to move, thereby driving the UAV to move. The conveying units placed in different directions are used to set and control the movement direction of the UAV. Some of the conveying units connected through side plate modules are arranged into conveying modules with different trajectories, and the conveying modules support splicing. The UAV moves on the conveying modules under the driving of each of the conveying unit to implement movement along different trajectories to reach a target position.

The side plate module of the conveying unit is provided with a side plate bump, a side plate recess, and a side plate hole. The side plate bump of each conveying unit is sleeved opposite to the side plate recess of the adjacent conveying unit. A hollow channel formed by the side plate holes of the adjacent conveying units is fixed by adopting a connecting shaft.

Preferably, the conveying unit includes a conveying module, a gear transmission system, a control module, a side plate module, and a base.

The side plate module is located outside the conveying module and the gear transmission system. An output end of the control module is connected to the gear transmission system. The base is connected to the bottom of the side plate module. The gear transmission system is used to jointly squeeze the conveyor with the conveying module through gear rotation to drive the conveyor to rotate. The conveying module is used to support and tension the conveyor at the same time.

The control module is used to control the on and off of the power supply, so that the gear transmission system rotates under the action of the power supply.

The side plate module is used to fix the conveying module and the gear transmission system while providing the side plate bump, the side plate recess, and the side plate hole, so that different conveying units are connected to each other through the side plate modules.

The base is used to connect an internal power supply of the modular bottom plate.

Preferably, the conveying module includes the conveyor, a first support shaft, a second support shaft, and a third support shaft. The third support shaft is connected to the control module. The first support shaft and the third support shaft are respectively located at two ends of the conveyor. The second support shaft is between the first support shaft and the third support shaft.

The first support shaft and the third support shaft are used to support and tension the conveyor. The second support shaft and the gear transmission system jointly squeeze the conveyor to drive the conveyor to rotate.

Preferably, the gear transmission system includes a motor, a fourth support shaft, and at least one gear conveying module.

An input end of the motor is connected to the output end of the control module. An output end of the motor is connected to an input end of the gear conveying module.

The motor is used to rotate under the driving of the control module to drive the gear conveying module to rotate. The fourth support shaft is used to support an end gear of the gear conveying module and is used to jointly squeeze the surface of the conveyor with the second support shaft, so that the conveyor rotates.

Preferably, the control module includes a driver, a stroke switch, a slide block, a rotating block, and the motor.

The slide block is installed at one end of the third support shaft, and the rotating block is installed at the other end of the third support shaft. A pressure plate on the surface of the slide block is connected to a contact of the stroke switch. The bottom of the slide block is provided with a spring part. The line of the stroke switch is connected to the driver.

The slide block is used to draw the third support shaft to slide downward when under pressure until the pressure plate triggers the stroke switch. The third support shaft resets when no longer under pressure. The rotating block is used to adapt to the positional change of the third support shaft. When the slide block equipped with the third support shaft slides, the rotating block rotates with the downward sliding of one end of the third support shaft. The driver is used to activate the motor through the power supply.

Preferably, the side plate module includes a first side plate, a second side plate, a third side plate, and a fourth side plate.

The first side plate and the second side plate are the side plates supporting the axial direction of the conveyor, and the two are placed directly opposite to each other and are used to support and fix the first support shaft, the second support shaft, the third support shaft, and the fourth support shaft. The first side plate is divided into upper and lower sub-plates. The lower sub-plate and the second side plate are jointly used to fix the first support shaft, the second support shaft, the third support shaft, and the fourth support shaft. The upper sub-plate is used to fix the gear transmission system. Two ends of a junction inside the upper and lower sub-plates are connected by adopting a side plate bolt, and the middle is positioned by a side plate boss.

The third side plate and the fourth side plate are the side plates supporting the radial direction of the conveyor, and the two are placed directly opposite to each other and perpendicular to the first side plate and the second side plate and are used to compensate for a depression generated between the adjacent conveyors.

Preferably, the base includes a flat plate, a three-stage convex platform plug, and a fixing pin. The bottom of the flat plate is provided with the fixing pin and the three-stage convex platform plug. The fixing pin and the three-stage convex platform plug are respectively connected to a bottom plate hole and a bottom plate interface of the modular bottom plate for positioning. The flat plate is used to support the motor and the driver.

The interface of the modular bottom plate is a three-stage interface, which corresponds to the three-stage convex platform plug of the base. A first-level line interface is used to connect a controller of the modular bottom plate to an encoder of the motor. A second-level line interface is used to connect the controller of the modular bottom plate to the driver. A third-level line interface is used to connect the power supply of the modular bottom plate to the driver.

Each outer surface of the side plate module of the conveying unit and each side plate of the modular bottom plate are provided with holes. The hole of each side plate of the conveying unit corresponds to the hole of each side plate of the modular bottom plate. The side plate of the conveying unit and the side plate of the corresponding modular bottom plate are connected through an insert block with two pins, so that the conveying unit is fixed to the modular bottom plate.

On the other hand, based on the multi-level structure conveying system for assisting UAV landing, the disclosure provides a corresponding conveying method, which includes the following steps.

In Step S1, according to a shape of a conveying scene region and a conveying target position, a shape of a conveying system is set.

In Step S2, a conveying path of the conveying system is determined according to the shape of the conveying system, and a type of a conveying module is selected to assemble the conveying system.

In Step S3, according to the conveying path and the type of the conveying module, a conveying unit is placed on a modular bottom plate in a specific direction based on a conveying direction of a conveyor to construct the conveying module. Then, conveying modules with different shapes are assembled into the conveying system.

In Step S4, when a UAV lands on a surface of the conveying system, a third support shaft in a conveying unit where the UAV is located is under downward pressure, and a slide block installed on the third support shaft also declines due to pressure.

In Step S5, a driver responds when a pressure plate on a surface of the slide block triggers a contact of a stroke switch during a downward sliding process.

In Step S6, the driver activates a motor connected to a power supply, and the motor drives a gear transmission system to rotate.

In Step S7, based on the rotation of the gear transmission system, a fourth support shaft and a second support shaft squeeze the conveyor to drive the conveyor to deliver the UAV.

In Step S8, when the UAV arrives from a current conveying unit to a next conveying unit along the conveying module, a spring at the bottom of the slide block of the current conveying unit resets the slide block, and the current conveying unit stops delivering. Steps S4 to S7 are repeated for the next conveying unit until the UAV reaches the target position.

The method for arranging each conveying unit into the conveying module is as follows.

After a side plate bump, a side plate recess, and a side plate hole are set outside each conveying unit, each conveying unit is arranged according to a topographic trajectory of the conveying module.

The side plate bump of each conveying unit is sleeved opposite to the side plate recess of the adjacent conveying unit.

After sleeving is completed, a connecting shaft is inserted into a hollow channel of the adjacent conveying units to be fixed.

The hollow channel is formed by the side plate holes of the adjacent conveying units.

Preferably, when the UAV lands on surfaces of multiple conveying units, the conveying units work at the same time, and the UAV moves with multiple conveyors. When directions of the conveyors on the conveying units are inconsistent, the UAV moves toward a resultant velocity direction of the conveyors.

Generally speaking, compared with the prior art, the above technical solutions conceived by the disclosure have the following beneficial effects.

The multi-level structure conveying system for assisting UAV landing according to the disclosure is constructed step by step of "unit-module-system". The conveying unit is a one-level sub-structure in the multi-level structure conveying system and only has a conveying execution component. However, the conveying unit may be mechanically matched and connected to the side plate structures of other conveying units according to its own unique side plate structure (the side plate bump, the side plate recess, and the side plate hole are set outside the conveying unit; the side plate bump of each conveying unit is sleeved opposite to the side plate recess of the adjacent conveying unit; and the hollow channel formed by the side plate holes of the adjacent conveying units is fixed by adopting the connecting shaft). At the same time, multiple conveying units correspond to multiple modular bottom plates. The modular bottom plate provides the line connection of the power supply, and the conveying units and the modular bottom plates jointly form a two-level structure conveying module. The conveying unit in the conveying module is connected to the modular bottom plate through a plug-in line, which can be independently driven and independently delivered, and the topography and the conveying direction of the entire conveying module can be changed through changing the installation position and the installation orientation of the conveying unit. According to the mission requirements of the entire conveying system and the shape of the target region range, the appropriate module shape is selected. The conveying modules with different shapes are assembled together through the mechanical combination of the modular bottom plates, which can be assembled into a complete conveying device. Therefore, since the disclosure provides the assembly of a hierarchical structure, the multi-structure conveying system according to the disclosure has good versatility, good replaceability between the conveying units and between the conveying modules, and good usability regarding the required conveying mission requirements and the shape of the scene region, so that the entire conveying system has a wide range of conveying capabilities.

The connection manner between the conveying unit and the conveying unit according to the disclosure is as follows. The side plate bump, the side plate recess, and the side plate hole are set outside the conveying unit. The side plate bump of each conveying unit is sleeved opposite to the side plate recess of the adjacent conveying unit. The hollow channel formed by the side plate holes of the adjacent conveying units is fixed by adopting the connecting shaft. The locking manner between the conveying unit and the conveying unit provided above improves the stability of the conveying module.

The three-stage interface is adopted between the base and the modular bottom plate according to the disclosure. The first-level line interface is used to connect the controller of the modular bottom plate to the encoder of the motor. The second-level line interface is used to connect the controller of the modular bottom plate to the driver. The third-level circuit interface is used to connect the power supply of the modular bottom plate to the driver. At the same time, the fixing pin is set at the bottom of the flat plate to cooperate with a base bolt to fix the base and the modular bottom plate. Therefore, the connection manner between the conveying unit and the modular bottom plate in the disclosure includes both line connection and structural positioning connection, which integrates drive control and positioning to reduce the space of the conveying unit.

In the disclosure, the outer surface of each side plate of the conveying unit and each side plate of the modular bottom plate are provided with holes. Each side plate of the conveying unit and each side plate of the modular bottom plate correspond one-to-one. The side plates of the corresponding conveying unit and modular bottom plate are connected through the insert block with two pins, which strengthens the stability of the entire system.

DETAILED DESCRIPTION OF DISCLOSED EMBODIMENTS

In order for the objectives, technical solutions, and advantages of the disclosure to be clearer, the disclosure is further described in detail below in conjunction with the accompanying drawings and embodiments. It should be understood that the specific embodiments described herein are only used to explain the disclosure, but not to limit the disclosure.

Embodiments

Figure 1:
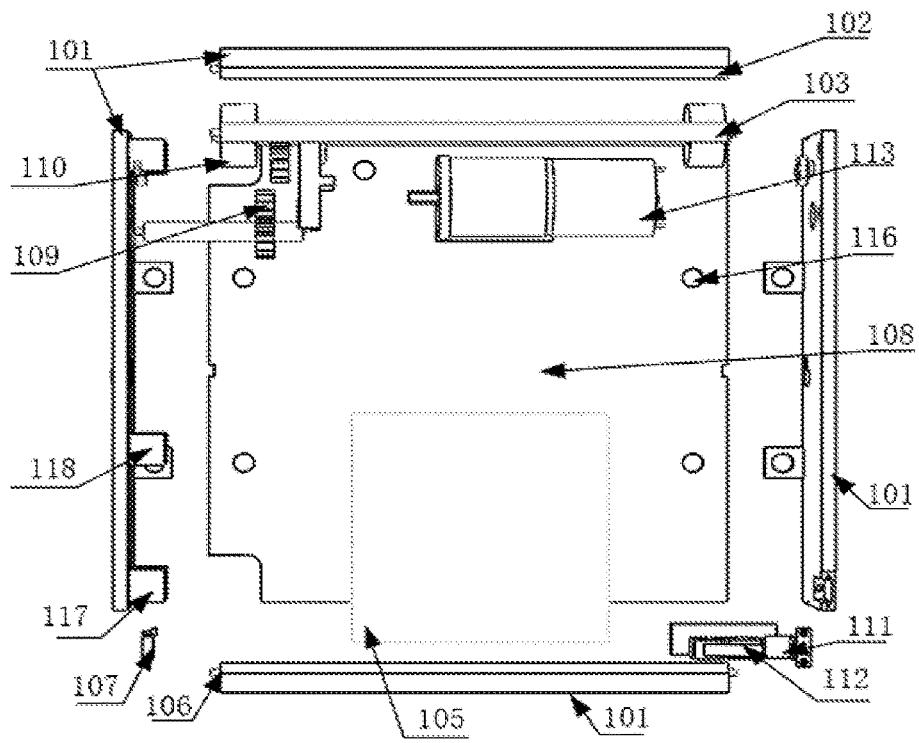
FIG. 1 is a central exploded view of a conveying unit according to an embodiment of the disclosure.
Figure 2:
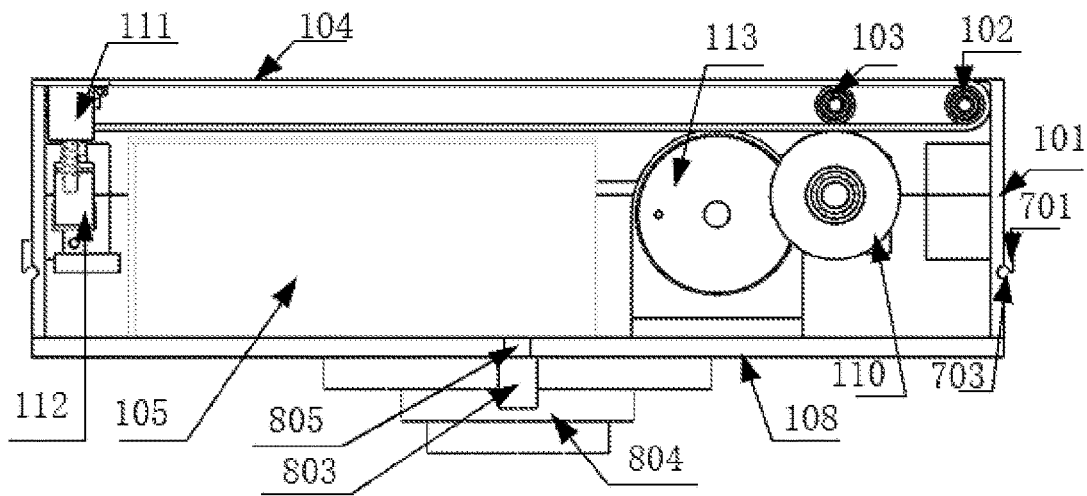
FIG. 2 is a cross-sectional view of a conveying unit according to an embodiment of the disclosure.
Figure 3:
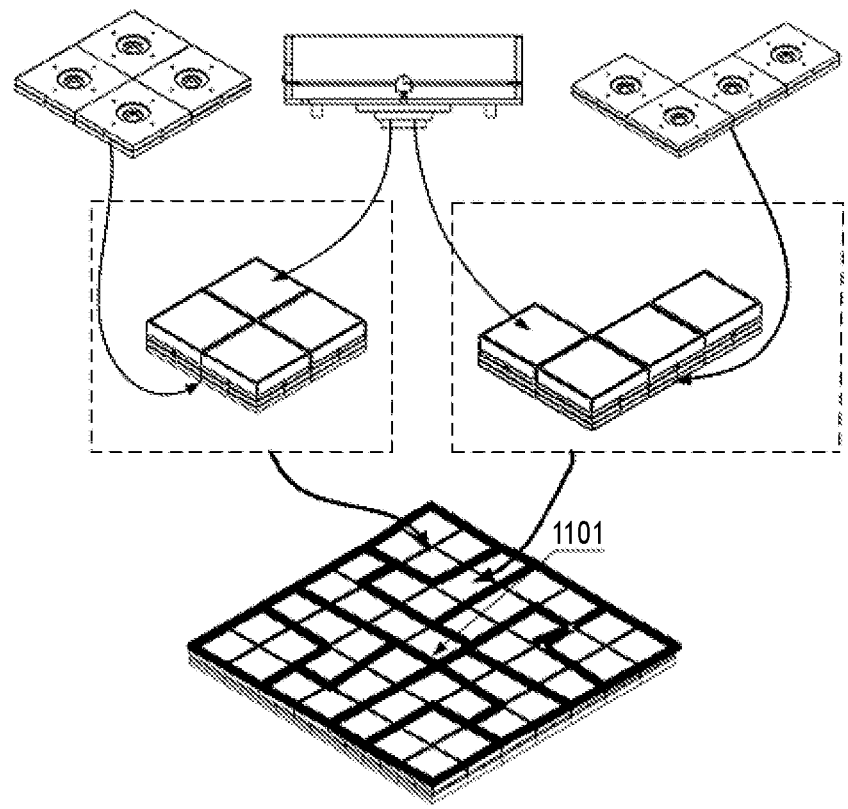
FIG. 3 is a configuration view of a multi-level structure conveying system according to an embodiment of the disclosure.

As shown in FIG. 1 and FIG. 2, a multi-level structure conveying system for assisting unmanned aerial vehicle (UAV) landing according to the embodiment includes several conveying units and a modular bottom plate. A conveying module is composed of several conveying units arranged in a specific order. Multiple conveying modules may be spliced, as shown in FIG. 3. The modular bottom plate is used to transmit a control signal and a power supply of an internal controller to the conveying unit. The conveying unit includes a conveying module, a gear transmission system, a control module, a side plate module, and a base.

The conveying module includes a conveyor 104 and three support shafts. The three support shafts are respectively a first support shaft 102, a second support shaft 103, and a third support shaft 106. The second support shaft 103 is used to drive the rotation of the conveyor 104. The first support shaft 102 and the third support shaft 106 are used to support and fix the position of the conveyor 104.

A gear transmission system 109 includes a motor 113, a fourth support shaft 110, and at least one set of gear conveying modules. The rotation of the motor 113 drives the gear conveying module connected to the motor 113 to rotate. The fourth support shaft 110 is used to support an end gear of the gear conveying module. The fourth support shaft 110 and the second support shaft 103 jointly squeeze the surface of the conveyor 104, so that the conveyor 104 rotates.

The control module includes a driver 105, a stroke switch 112, a slide block 111, a rotating block 107, and the motor 113. The slide block 111 is installed at one end of the third support shaft 106, and the rotating block 107 is installed at the other end of the third support shaft 106. A pressure plate on the surface of the slide block 111 is connected to a contact of the stroke switch 112. The bottom of the slide block 111 is provided with a spring device. The line of the stroke switch 112 is connected to the driver 105.

The side plate module is a cuboid structure with a square bottom surface composed of four side plates 101 around the conveyor 104.

The two side plates supporting the axial direction of the conveyor 104 are used to support and fix the first support shaft 102, the second support shaft 103, the third support shaft 106, and the fourth support shaft 110. One side plate includes upper and lower sub-plates, which are convenient for the installation of the conveying module and the gear transmission system. Two ends of a junction inside the upper and lower sub-plates are connected by a side plate bolt 117, and the middle is positioned by a side plate boss 118.

The two side plates supporting the radial direction of the conveyor 104 are used to compensate for a depression generated between the adjacent conveyors 104.

The base 108 includes a fixing pin 803, a square flat plate, and a three-stage convex platform plug 804. The flat plate is used to support devices such as the motor and the driver 105, and fix the side plate through a base bolt 116. There are two fixing pins 803 connected to the modular bottom plate and the three-stage convex platform plug 804 under the flat plate. The connection between the fixing pin 803 and the three-stage convex platform plug 804 and a bottom plate hole 801 and a bottom plate interface 802 of the modular bottom plate for positioning. A controller is used to control UAVs with different qualities to convey at a preset speed on multiple conveying units.

The method of conveying a UAV of the conveying unit is as follows.

When an object falls on the conveying unit, and when an object that needs to be conveyed falls on the surface of the conveyor 104, the first support shaft 102, the second support shaft 103, and the third support shaft 106 supporting the conveyor 104 are all under pressure.

The third support shaft 106 installed in the slide block 111 slides down with the slide block 111 under pressure. The rotating block 107 on the other side slightly rotates to adapt to the position of the slide block 111. The slide block 111 slides downward. The pressure plate on the surface of the slide block 111 triggers the stroke switch 112.

The driver 105 starts to work. The driver 105 activates the motor 113 through the power supply and drives the gear transmission system 109 to rotate. The fourth support shaft 110 and the second support shaft 103 squeeze the conveyor, so that the conveyor 104 starts to convey the object on the surface.

When the conveyed object no longer contacts the surface of the conveyor 104, the spring at the bottom of the slide block 111 resets the slide block, the pressure plate on the surface of the slide block no longer triggers the stroke switch 112, the driver 105 stops working, the motor 113 stops rotating, and the conveyor 104 also stops conveying at the same time.

Figure 4A:
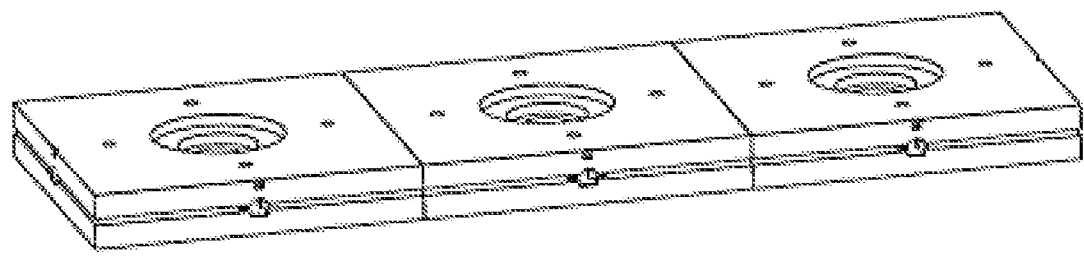
FIG. 4A is a schematic view of connection of a straight-type modular bottom plate according to an embodiment of the disclosure.
Figure 4B:
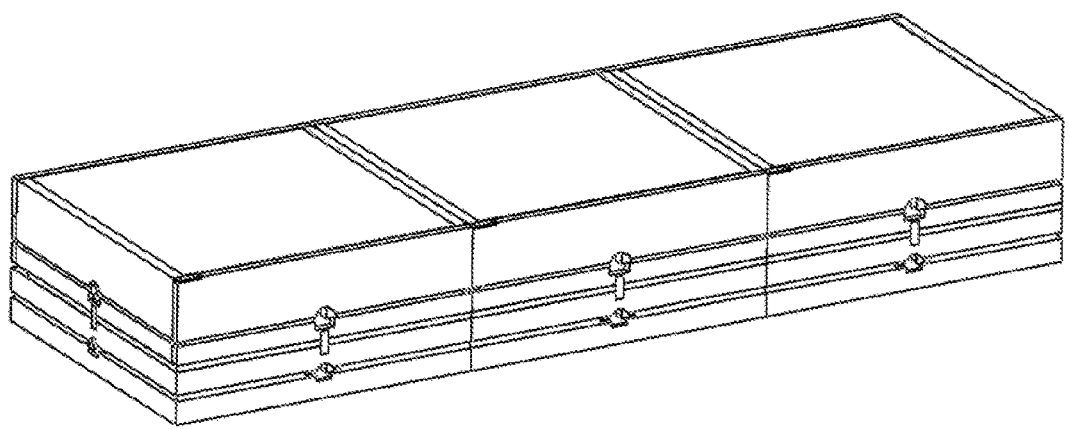
FIG. 4B is a schematic view of connection of a straight-type conveying module according to an embodiment of the disclosure.
Figure 4C:
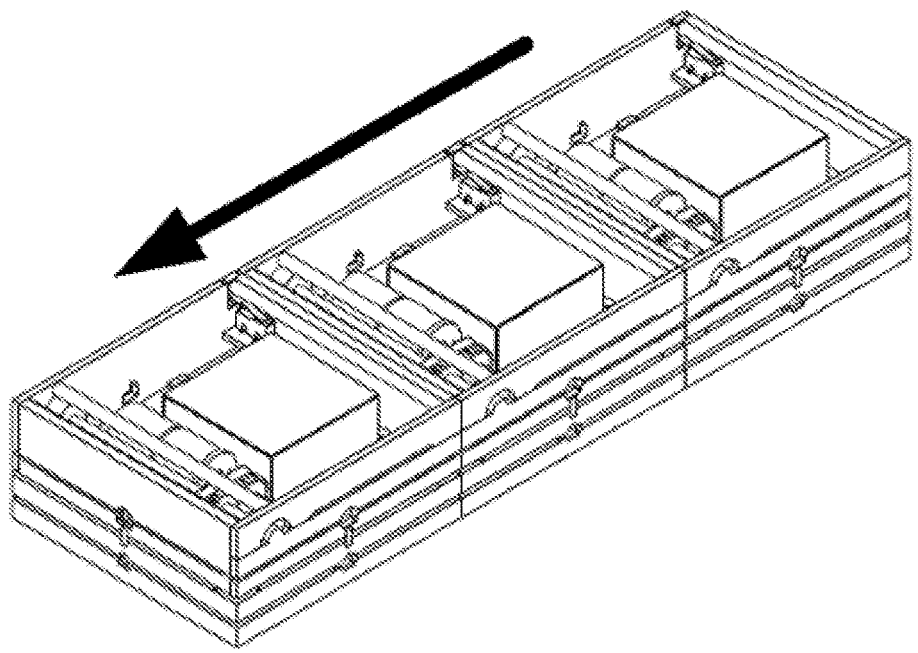
FIG. 4C is a schematic view of a conveying direction of each conveying unit in the straight-type conveying module according to an embodiment of the disclosure.
Figure 5A:
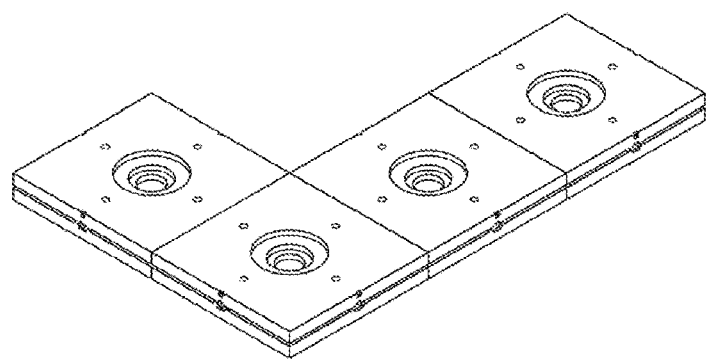
FIG. 5A is a schematic view of connection of an L-shaped modular bottom plate according to an embodiment of the disclosure.
Figure 5B:
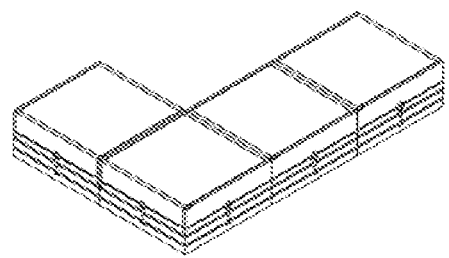
FIG. 5B is a schematic view of connection of an L-shaped conveying module according to an embodiment of the disclosure.
Figure 5C:
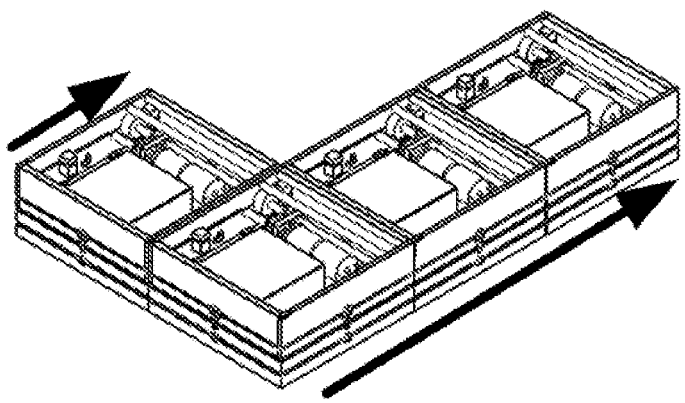
FIG. 5C is a schematic view of a conveying direction of each conveying unit in the L-shaped conveying module according to an embodiment of the disclosure.
Figure 6A:
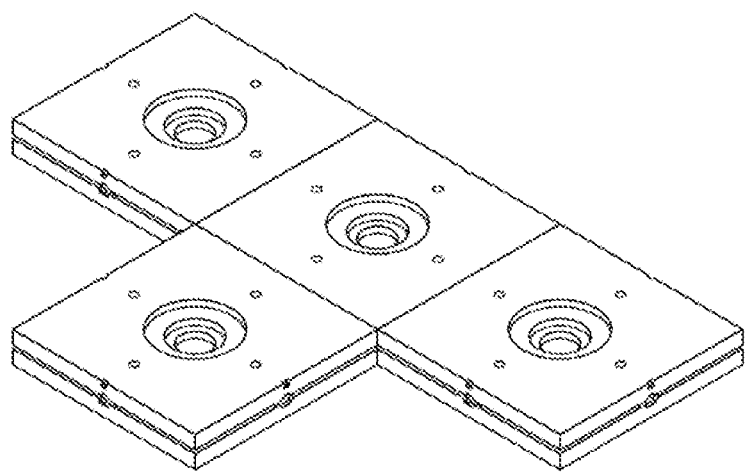
FIG. 6A is a schematic view of connection of a T-shaped modular bottom plate according to an embodiment of the disclosure.
Figure 6B:
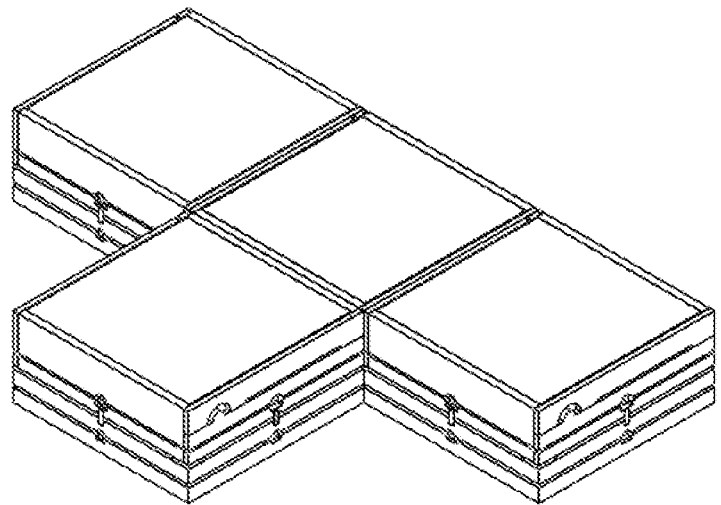
FIG. 6B is a schematic view of connection of a T-shaped conveying module according to an embodiment of the disclosure.
Figure 6C:
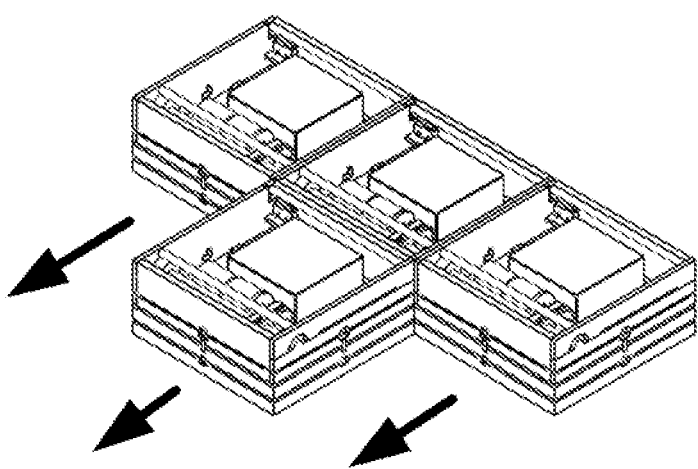
FIG. 6C is a schematic view of a conveying direction of each conveying unit in the T-shaped conveying module according to an embodiment of the disclosure.
Figure 7A:
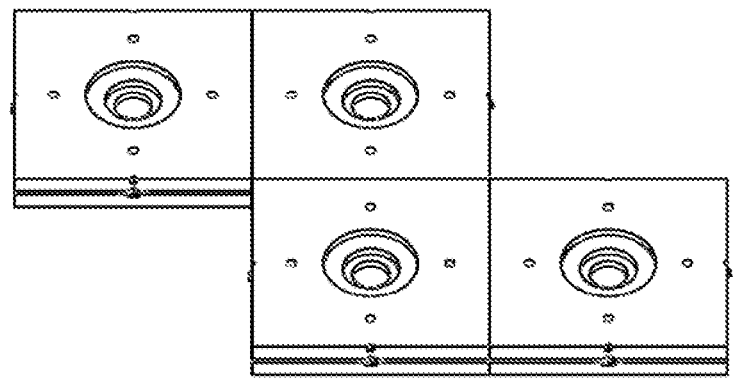
FIG. 7A is a schematic view of connection of a Z-shaped modular bottom plate according to an embodiment of the disclosure.
Figure 7B:
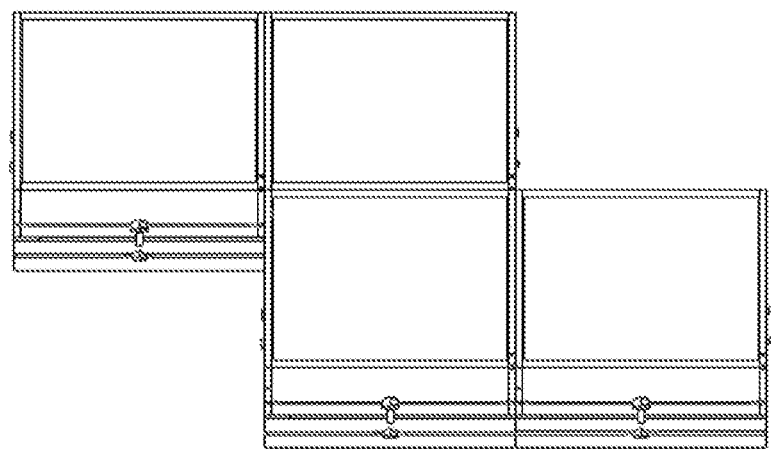
FIG. 7B is a schematic view of connection of a Z-shaped conveying module according to an embodiment of the disclosure.
Figure 7C:
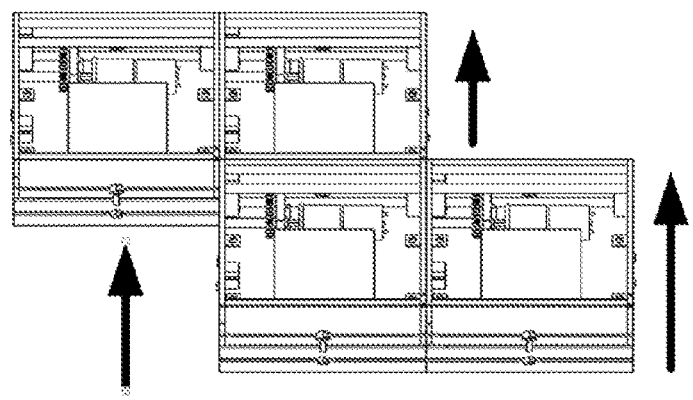
FIG. 7C is a schematic view of a conveying direction of each conveying unit in the Z-shaped conveying module according to an embodiment of the disclosure.
Figure 8A:
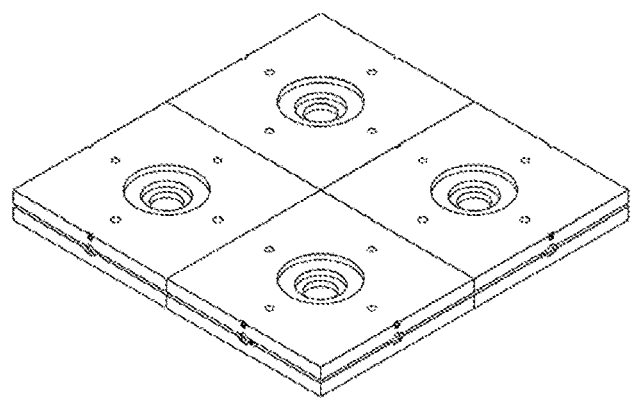
FIG. 8A is a schematic view of connection of a 2×2 square modular bottom plate according to an embodiment of the disclosure.
Figure 8B:
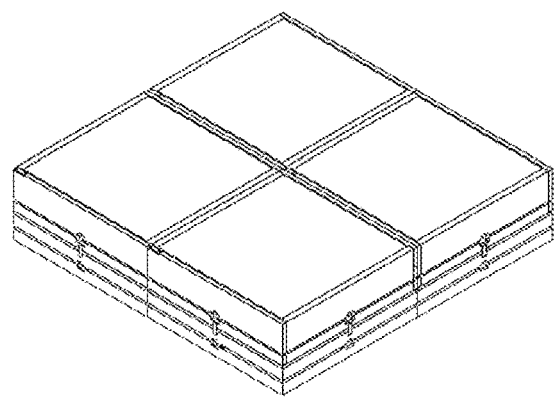
FIG. 8B is a schematic view of connection of a 2×2 square modular bottom plate according to an embodiment of the disclosure.
Figure 8C:
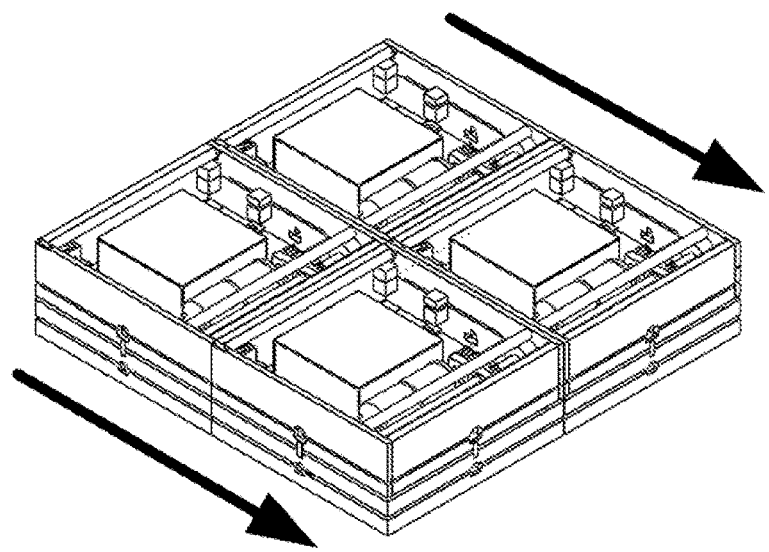
FIG. 8C is a schematic view of a conveying direction of each conveying unit in the 2×2 square modular bottom plate according to an embodiment of the disclosure.
Figure 9A:
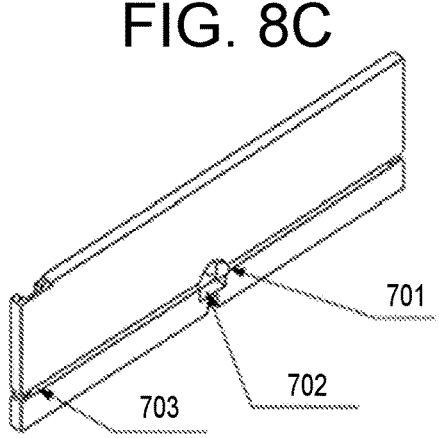
FIG. 9A is a schematic view of a side plate according to an embodiment of the disclosure.
Figure 9B:
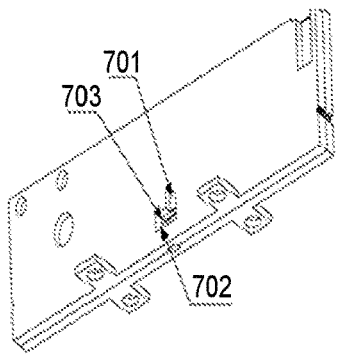
FIG. 9B is a schematic view of two side plates abutting against each other according to an embodiment of the disclosure.
Figure 9C:
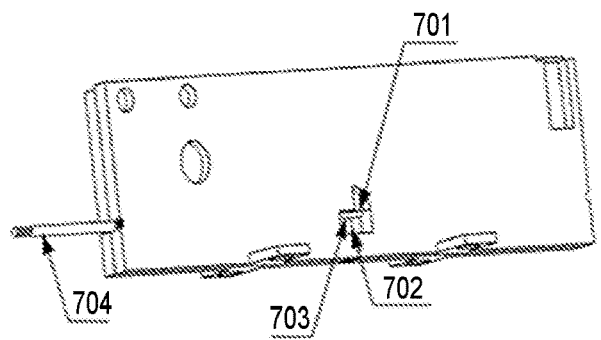
FIG. 9C is a schematic view of inserting a threaded connecting shaft into the two side plates according to an embodiment of the disclosure.
Figure 9D:
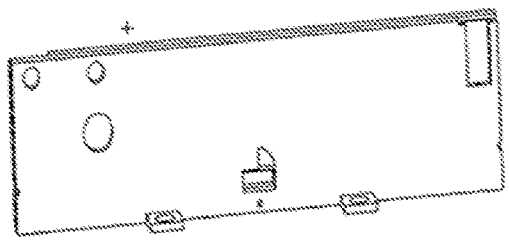
FIG. 9D is a schematic view of the two side plates after being assembled according to an embodiment of the disclosure.
Figure 10A:
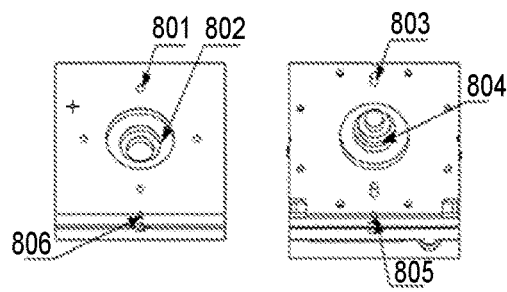
FIG. 10A is a schematic view of connection parts between a modular bottom plate and a conveying unit according to an embodiment of the disclosure.
Figure 10B:
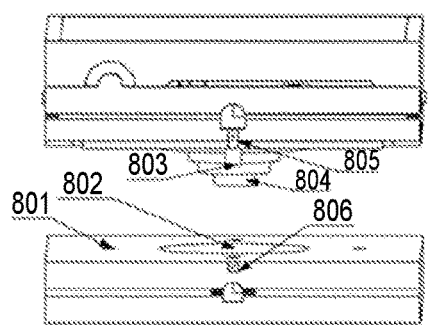
FIG. 10B is a schematic view of connection positions between the modular bottom plate and the conveying unit according to an embodiment of the disclosure.
Figure 10C:
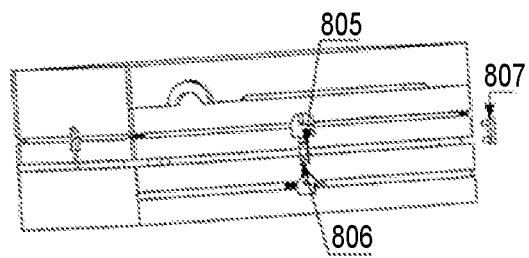
FIG. 10C is a schematic view of installing an insert block between the modular bottom plate and the conveying unit according to an embodiment of the disclosure.
Figure 10D:
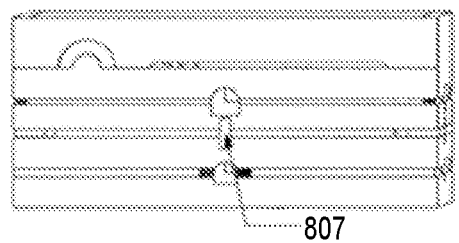
FIG. 10D is a schematic view of the modular bottom plate and the conveying unit after being assembled according to an embodiment of the disclosure.

FIG. 4A to FIG. 4C show a straight-type conveying module in a conveying system. FIG. 5A to FIG. 5C show an L-shaped conveying module in a conveying system. FIG. 6A to FIG. 6C show a T-shaped conveying module in a conveying system. FIG. 7A to FIG. 7C show a Z-shaped conveying module in a conveying system. FIG. 8A to FIG. 8C show a 2×2 square modular bottom plate in a conveying system. The modular bottom plate includes the controller of the modular bottom plate, the bottom plate hole 801, the bottom plate interface 802, and a modular bottom plate recess 806.

The modular bottom plate interface 802 is also a three-stage interface, which corresponds to the three-stage interface of the base of the conveying unit. A first-level line interface is used to connect the controller of the modular bottom plate to an encoder of the motor in the conveying unit. A second-level line interface is used to connect the controller of the modular bottom plate to the driver 105 in the conveying unit. A third-level line interface is used to connect the power supply of the modular bottom plate to the driver 105 in the conveying unit.

The side of the modular bottom plate includes a side plate bump 701 with a hole, a side plate recess 702, and a side plate hole. The hole is used to connect the conveying unit and the modular bottom plate. The conveying unit is positioned connected with the modular bottom plate through the pin on the conveying unit and the three-stage convex platform plug. The outer surface of the side plate of the conveying unit and the side plate of the modular bottom plate both have a hole. The conveying unit is connected to the modular bottom plate through an insert block with two pins.

FIG. 9A to FIG. 9D are schematic views of connection of two conveying units. Connecting pieces between adjacent conveying units are located outside the four side plates 101. Each side plate has the side plate bump 701 and the side plate recess 702. The bottom of the side plate bump 701 is provided with a circular side plate hole 703. Two conveying units that need to be connected respectively correspond to the side plate bump 701 and the side plate recess 702. The circular side plate holes 703 of the two side plate bumps 701 are fixed by a connecting shaft 704 with port being threaded. The two conveying units are engaged with each other and cannot automatically fall off, so that the structure is firmly tightened.

FIG. 10A to FIG. 10D are schematic views of connection between a modular bottom plate and a conveying unit. A conveying unit recess 805 and a modular bottom plate recess 806 are used to connect the conveying unit to the modular bottom plate. The conveying unit is positioned connected with the modular bottom plate through the pin on the conveying unit and the three-stage convex platform plug. The outer surface of the side plate of the conveying unit and the side plate of the modular bottom plate both have a hole. The conveying unit is connected to a modular bottom plate through an insert block 807 with two pins.

Figure 11A:
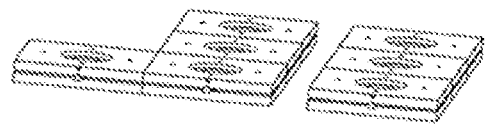
FIG. 11A is a schematic view of an installation position between a modular bottom plate and a modular bottom plate according to an embodiment of the disclosure.
Figure 11B:
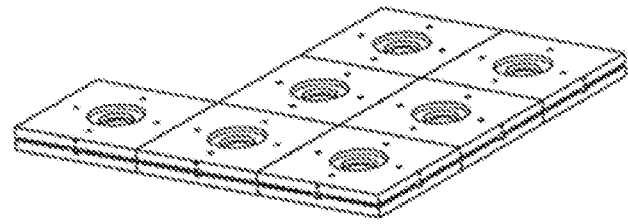
FIG. 11B is a schematic view of the modular bottom plate and the modular bottom plate after being assembled according to an embodiment of the disclosure.

FIG. 11A to FIG. 11B are schematic views of connection between a modular bottom plate and a modular bottom plate. The connection between the modular bottom plate and the modular bottom plate is similar to the connection between units. A bump and a recess on the side of the modular bottom plate are used for the connection between the module and the module. The bump and the recess on the side of the modular bottom plate are respectively connected to the recess and the bump of the connected modular bottom plate. The threaded connecting shaft 704 is inserted to fix a circular recess formed by the connection between the two modular bottom plates. The connection between different conveying modules can also enable a connecting insert block between the unit and the modular bottom plate to be clamped, so that the structure of the entire system is more firmly tightened.

Figure 12:
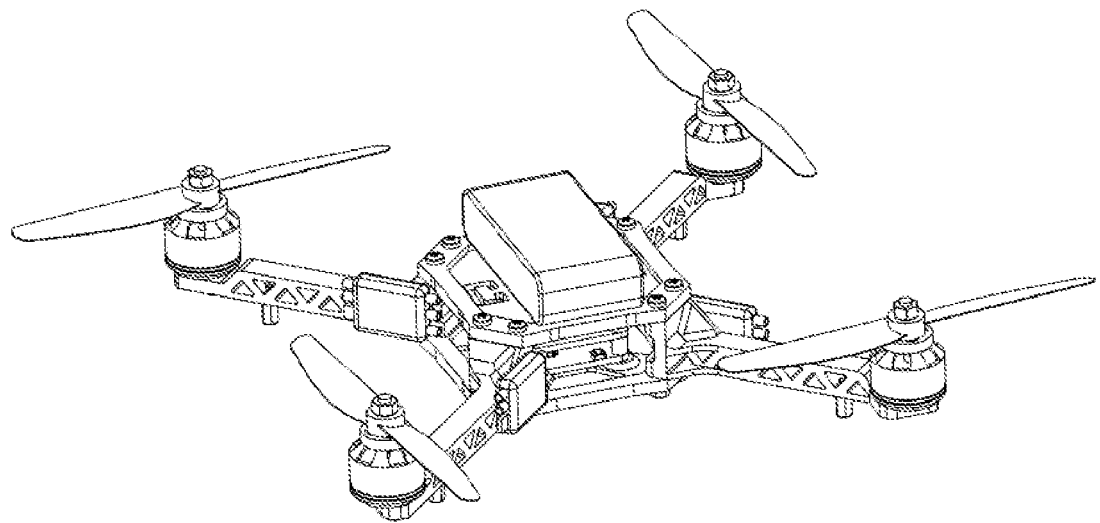
FIG. 12 is a schematic view of an unmanned aerial vehicle (UAV) model according to an embodiment of the disclosure.
Figure 13A:
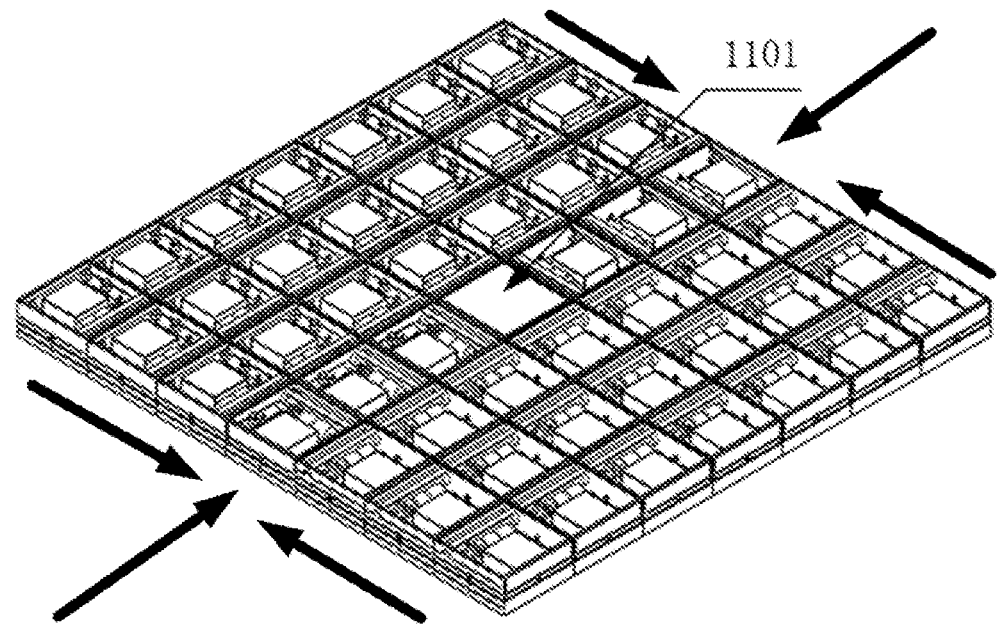
FIG. 13A is an overall cross-sectional view and a conveying path view of a conveying system according to an embodiment of the disclosure.
Figure 13B:
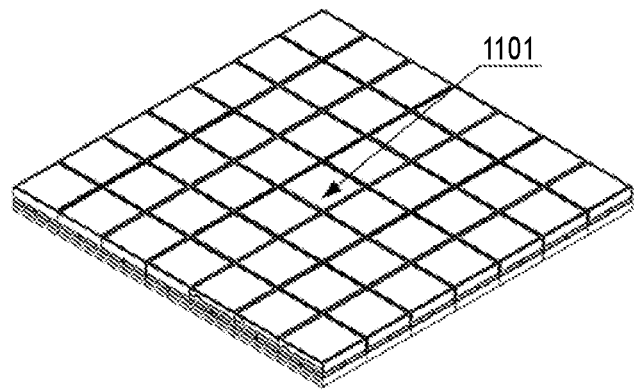
FIG. 13B is a schematic view of an overall assembly of the conveying system according to an embodiment of the disclosure.
Figure 14A:
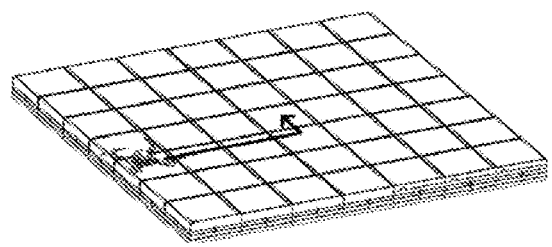
FIG. 14A is a schematic view of a complete path that a conveying system for UAV landing needs to move according to an embodiment of the disclosure.
Figure 14B:
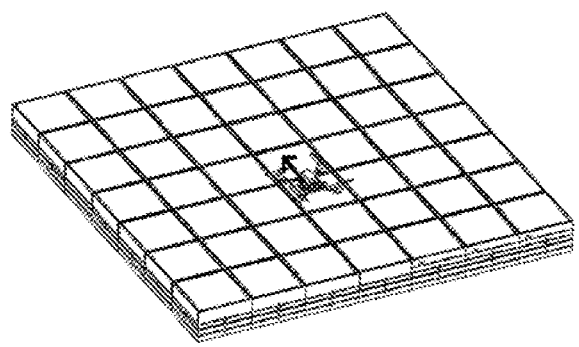
FIG. 14B is a view of the remaining path that a UAV needs to move to reach a target position according to an embodiment of the disclosure.
Figure 14C:
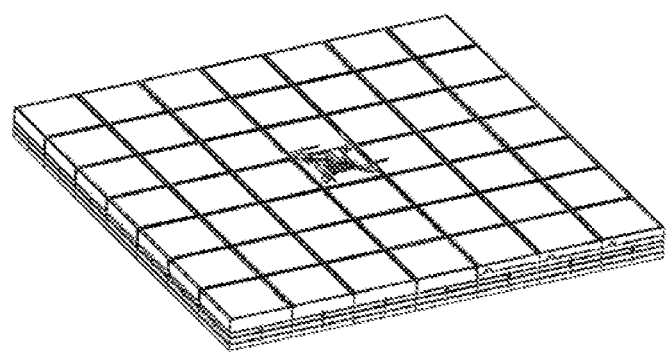
FIG. 14C is a schematic view of the UAV reaching the target position according to an embodiment of the disclosure.

FIG. 12 is a schematic view of a UAV model according to the embodiment. FIG. 13A is an overall cross-sectional view and a conveying path view of a conveying system. FIG. 13B is a view of an overall assembly of the conveying system. FIG. 14A is a schematic view of a complete path that a conveying system for UAV landing needs to move according to the embodiment. FIG. 14B is a view of the remaining path that a UAV needs to move to reach a target position according to the embodiment. FIG. 14C is a schematic view of the UAV reaching the target position according to the embodiment. For the conveying system, the operation process of the conveying system is described in detail below.

When the UAV lands on the conveyor 104, the third support shaft 106 is under downward pressure, and the slide block 111 installed with the third support shaft 106 declines due to pressure. The rotating block 107 slightly adjusts its angle as the slide block 111 slides downward, the pressure plate on the surface of the slide block 111 sliding downward triggers the contact of the stroke switch 112, the stroke switch 112 is triggered, and the driver 105 responds. The power is connected through the line of the three-stage convex platform plug 804. The driver 105 drives the motor 113 to rotate, and the entire gear transmission system 109 moves. The fourth support shaft 110 and the second support shaft 103 jointly squeeze the conveyor 104 between the two shafts. The conveyor 104 conveys the UAV to the next conveying unit. The UAV contacts the next conveying unit. The stroke switch on the conveying unit 112 is triggered, and the conveying unit starts normal operation. The conveying unit will not stop working until the UAV completely leaves the surface of the conveying unit.

The UAV may also be acted on by multiple conveying units at the same time. A resultant velocity direction of the conveying units is a conveying direction of the UAV. The conveying units will not stop working until the UAV is conveyed to a target position 1101.

It should be pointed out that the multi-level structure conveying system according to the disclosure is not only suitable for assisting UAV landing and conveying the UAV, but also suitable for other conveyable objects.

In summary, compared with the prior art, the disclosure has the following advantages.

The multi-level structure conveying system for assisting UAV landing according to the disclosure is constructed step by step of "unit-module-system". The conveying unit is a one-level sub-structure in the multi-level structure conveying system and only has a conveying execution component. However, the conveying unit may be mechanically matched and connected to the side plate structures of other conveying units according to its own unique side plate structure (the side plate bump, the side plate recess, and the side plate hole are set outside the conveying unit; the side plate bump of each conveying unit is sleeved opposite to the side plate recess of the adjacent conveying unit; and the hollow channel formed by the side plate holes of the adjacent conveying units is fixed by adopting the connecting shaft). At the same time, multiple conveying units correspond to multiple modular bottom plates. The modular bottom plate provides the line connection of the power supply, and the conveying units and the modular bottom plates jointly form a two-level structure conveying module. The conveying unit in the conveying module is connected to the modular bottom plate through a plug-in line, which can be independently driven and independently delivered, and the topography and the conveying direction of the entire conveying module can be changed through changing the installation position and the installation orientation of the conveying unit. According to the mission requirements of the entire conveying system and the shape of the target region range, the appropriate module shape is selected. The conveying modules with different shapes are assembled together through the mechanical combination of the modular bottom plates, which can be assembled into a complete conveying device. Therefore, since the disclosure provides the assembly of a hierarchical structure, the multi-structure conveying system according to the disclosure has good versatility, good replaceability between the conveying units and between the conveying modules, and good usability regarding the required conveying mission requirements and the shape of the scene region, so that the entire conveying system has a wide range of conveying capabilities.

The connection manner between the conveying unit and the conveying unit according to the disclosure is as follows. The side plate bump, the side plate recess, and the side plate hole are set outside the conveying unit. The side plate bump of each conveying unit is sleeved opposite to the side plate recess of the adjacent conveying unit. The hollow channel formed by the side plate holes of the adjacent conveying units is fixed by adopting the connecting shaft. The locking manner between the conveying unit and the conveying unit provided above improves the stability of the conveying module.

The three-stage interface is adopted between the base and the modular bottom plate according to the disclosure. The first-level line interface is used to connect the controller of the modular bottom plate to the encoder of the motor. The second-level line interface is used to connect the controller of the modular bottom plate to the driver. The third-level circuit interface is used to connect the power supply of the modular bottom plate to the driver. At the same time, the fixing pin is set at the bottom of the flat plate to cooperate with the base bolt to fix the base and the modular bottom plate. Therefore, the connection manner between the conveying unit and the modular bottom plate in the disclosure includes both line connection and structural positioning connection, which integrates drive control and positioning to reduce the space of the conveying unit.

In the disclosure, the outer surface of each side plate of the conveying unit and each side plate of the modular bottom plate are provided with holes. The position of the hole of each side plate of the conveying unit corresponds to the position of the hole on each side plate of the modular bottom plate. The side plates of the corresponding conveying unit and modular bottom plate are connected through the insert block with two pins, which strengthens the stability of the entire system.

Persons skilled in the art can easily understand that the above are only preferred embodiments of the disclosure and are not intended to limit the disclosure. Any modification, equivalent replacement, improvement, etc., made within the spirit and principle of the disclosure should all be included in the protection scope of the disclosure.

What is claimed is:

1. A multi-level structure conveying system for assisting unmanned aerial vehicle (UAV) landing, comprising a plurality of conveying units and a plurality of modular bottom plates, wherein the conveying units are fixedly placed on the modular bottom plate;

the modular bottom plate is used to transmit a control signal and a power supply of an internal controller to the conveying unit; the conveying unit is used to drive a conveyor to move, thereby driving the UAV to move; the conveying units placed in different directions are used to set a movement direction of the UAV; some of the conveying units connected through side plate modules are arranged into conveying modules with different trajectories, the conveying modules support splicing, the UAV moves on the conveying modules under driving of each of the conveying unit to implement movement along different trajectories to reach a target position; and the side plate module of the conveying unit comprises a side plate bump, a side plate recess, and a side plate hole; the side plate bump of each conveying unit is sleeved opposite to the side plate recess of the adjacent conveying unit; and a hollow channel formed by the side plate holes of the adjacent conveying units is fixed by adopting a connecting shaft.

2. The multi-level structure conveying system according to claim 1, wherein the conveying unit comprises a conveying module, a gear transmission system, a control module, a side plate module, and a base;

the side plate module is located outside the conveying module and the gear transmission system; an output end of the control module is connected to the gear transmission system; and the base is connected to a bottom of the side plate module;

the gear transmission system is used to jointly squeeze the conveyor with the conveying module through gear rotation to drive the conveyor to rotate; and the conveying module is used to support and tension the conveyor at a same time;

the control module is used to control on and off of the power supply, so that the gear transmission system rotates under action of the power supply;

the side plate module is used to fix the conveying module and the gear transmission system while providing the side plate bump, the side plate recess, and the side plate hole, so that different conveying units are connected to each other through the side plate modules; and the base is used to connect an internal power supply of the modular bottom plate.

3. The multi-level structure conveying system according to claim 2, wherein the conveying module comprises the conveyor, a first support shaft, a second support shaft, and a third support shaft;

the third support shaft is connected to the control module; the first support shaft and the third support shaft are located at two ends of the conveyor; and the second support shaft is between the first support shaft and the third support shaft; and the first support shaft and the third support shaft are used to support and tension the conveyor; and the second support shaft and the gear transmission system jointly squeeze the conveyor to drive the conveyor to rotate.

4. The multi-level structure conveying system according to claim 3, wherein the gear transmission system comprises a motor, a fourth support shaft, and at least one set of gear conveying modules;

an input end of the motor is connected to the output end of the control module; and an output end of the motor is connected to an input end of the gear conveying module; and the motor is used to rotate under driving of the control module to drive the gear conveying module to rotate; and the fourth support shaft is used to support an end gear of the gear conveying module and is used to jointly squeeze a surface of the conveyor with the second support shaft, so that the conveyor rotates.

5. The multi-level structure conveying system according to claim 3, wherein the control module comprises a driver, a stroke switch, a slide block, a rotating block, and a motor;

the slide block is installed at one end of the third support shaft; the rotating block is installed at another end of the third support shaft; a pressure plate on a surface of the slide block is connected to a contact of the stroke switch; a bottom of the slide block is provided with a spring part; and a line of the stroke switch is connected to the driver; and the slide block is used to draw the third support shaft to slide downward when under pressure until the pressure plate triggers the stroke switch; the third support shaft resets when no longer under pressure; the rotating block is used to adapt to a positional change of the third support shaft; when the slide block equipped with the third support shaft slides, the rotating block rotates with downward sliding of one end of the third support shaft; and the driver is used to activate the motor through the power supply.

6. The multi-level structure conveying system according to claim 3, wherein the side plate module comprises a first side plate, a second side plate, a third side plate, and a fourth side plate;

the first side plate and the second side plate are side plates supporting an axial direction of the conveyor, are placed directly opposite to each other, and are used to support and fix the first support shaft, the second support shaft, the third support shaft, and the fourth support shaft; the first side plate is divided into upper and lower sub-plates; the lower sub-plate and the second side plate are jointly used to fix the first support shaft, the second support shaft, the third support shaft, and the fourth support shaft; the upper sub-plate is used to fix the gear transmission system; and two ends of a junction inside the upper and lower sub-plates are connected by adopting a side plate bolt, and a middle is positioned by a side plate boss; and the third side plate and the fourth side plate are side plates supporting a radial direction of the conveyor, are placed directly opposite to each other and perpendicular to the first side plate and the second side plate, and are used to compensate for a depression generated between the adjacent conveyors.

7. The multi-level structure conveying system according to claim 5, wherein the base comprises a flat plate, a three-stage convex platform plug, and a fixing pin; the fixing pin and the three-stage convex platform plug are respectively connected to a bottom plate hole and an interface of the modular bottom plate for positioning; and the flat plate is used to support the motor and the driver; and the interface of the modular bottom plate is a three-stage interface, which corresponds to the three-stage convex platform plug of the base, wherein a first-level line interface is used to connect a controller of the modular bottom plate to an encoder of the motor; a second-level line interface is used to connect the controller of the modular bottom plate to the driver; and a third-level line interface is used to connect the power supply of the modular bottom plate to the driver.

8. The multi-level structure conveying system according to claim 7, wherein each outer surface of the side plate module of the conveying unit and each side plate of the modular bottom plate are provided with holes, a position of the hole of each side plate of the conveying unit corresponds to a position of the hole of each side plate of the modular bottom plate, and the side plate of the conveying unit and the side plate of the corresponding modular bottom plate are connected through an insert block with two pins.

9. A conveying method based on the multi-level structure conveying system of claim 5, comprising:

Step S1: according to a shape of a conveying scene region and a conveying target position, a shape of a conveying system being set;

Step S2: a conveying path of the conveying system being determined according to the shape of the conveying system, and a type of a conveying module being selected to assemble the conveying system;

Step S3: according to the conveying path and the type of the conveying module, a conveying unit being placed on a modular bottom plate in a specific direction based on a conveying direction of a conveyor to construct the conveying module; and then the conveying modules with different shapes being assembled into the conveying system;

Step S4: when the UAV landing on a surface of the conveying system, a third support shaft in a conveying unit where the UAV being located being under downward pressure, and a slide block installed on the third support shaft also declining due to pressure;

Step S5: a driver responding when a pressure plate on a surface of the slide block triggering a contact of a stroke switch during a downward sliding process;

Step S6: the driver activating a motor connected to a power supply, and the motor driving a gear transmission system to rotate;

Step S7: based on the rotation of the gear transmission system, a fourth support shaft and a second support shaft squeezing the conveyor to drive the conveyor to deliver the UAV; and Step S8: when the UAV arriving from a current conveying unit to a next conveying unit along the conveying module, a spring at the bottom of the slide block of the current conveying unit resetting the slide block, and the current conveying unit stopping delivering; and steps S4 to S7 being repeated for the next conveying unit until the UAV reaches the target position, wherein a method for arranging each conveying unit into the conveying module comprises:

arranging each conveying unit according to a topographic trajectory of the conveying module after a side plate bump, a side plate recess, and a side plate hole are set outside each conveying unit;

sleeving the side plate bump of each conveying unit opposite to the side plate recess of the adjacent conveying unit; and inserting a connecting shaft into a hollow channel of the adjacent conveying units to be fixed after sleeving is completed, wherein the hollow channel is formed by the side plate holes of the adjacent conveying units.

10. The conveying method according to claim 9, wherein when the UAV lands on surfaces of a plurality of conveying units, the conveying units work at a same time, and the UAV moves with a plurality of conveyors; and when directions of the conveyors on the conveying units are inconsistent, the UAV moves toward a resultant velocity direction of the conveyors.

11. The multi-level structure conveying system according to claim 4, wherein the control module comprises a driver, a stroke switch, a slide block, a rotating block, and a motor;

the slide block is installed at one end of the third support shaft; the rotating block is installed at another end of the third support shaft; a pressure plate on a surface of the slide block is connected to a contact of the stroke switch; a bottom of the slide block is provided with a spring part; and a line of the stroke switch is connected to the driver; and the slide block is used to draw the third support shaft to slide downward when under pressure until the pressure plate triggers the stroke switch; the third support shaft resets when no longer under pressure; the rotating block is used to adapt to a positional change of the third support shaft; when the slide block equipped with the third support shaft slides, the rotating block rotates with downward sliding of one end of the third support shaft; and the driver is used to activate the motor through the power supply.

12. The multi-level structure conveying system according to claim 4, wherein the side plate module comprises a first side plate, a second side plate, a third side plate, and a fourth side plate;

the first side plate and the second side plate are side plates supporting an axial direction of the conveyor, are placed directly opposite to each other, and are used to support and fix the first support shaft, the second support shaft, the third support shaft, and the fourth support shaft; the first side plate is divided into upper and lower sub-plates; the lower sub-plate and the second side plate are jointly used to fix the first support shaft, the second support shaft, the third support shaft, and the fourth support shaft; the upper sub-plate is used to fix the gear transmission system; and two ends of a junction inside the upper and lower sub-plates are connected by adopting a side plate bolt, and a middle is positioned by a side plate boss; and the third side plate and the fourth side plate are side plates supporting a radial direction of the conveyor, are placed directly opposite to each other and perpendicular to the first side plate and the second side plate, and are used to compensate for a depression generated between the adjacent conveyors.

* * * * *